(12) United States Patent
Webb (10) Patent No.: US 11,064,815 B2
(45) Date of Patent: Jul. 20, 2021

(54) APPARATUS AND METHOD FOR A CHILD SEAT WITH ADJUSTABLE CROTCH BUCKLE POSITIONER

(71) Applicant: GRACO CHILDREN'S PRODUCTS, INC., Atlanta, GA (US)

(72) Inventor: Joseph Christopher Webb, Wilmington, DE (US)

(73) Assignee: GRACO CHILDREN'S PRODUCTS, INC., Atlanta, GA (US)

( * ) Notice: Subject to any disclaimer, the term of this patent is extended or adjusted under 35 U.S.C. 154(b) by 0 days.

(21) Appl. No.: 16/502,925

(22) Filed: Jul. 3, 2019

(65) Prior Publication Data

US 2020/0008587 A1     Jan. 9, 2020

Related U.S. Application Data

(60) Provisional application No. 62/694,651, filed on Jul. 6, 2018.

(51) Int. Cl.
| | |
|---|---|
| *B60N 2/26* | (2006.01) |
| *A47D 15/00* | (2006.01) |
| *B60N 2/28* | (2006.01) |
| *A47D 13/02* | (2006.01) |
| *B62B 9/24* | (2006.01) |

(52) U.S. Cl.
CPC ......... *A47D 15/006* (2013.01); *A47D 13/025* (2013.01); *B60N 2/2812* (2013.01); *B60N 2/2866* (2013.01); *A47D 15/005* (2013.01); *B60N 2002/2815* (2013.01); *B62B 9/24* (2013.01)

(58) Field of Classification Search
CPC .. A47D 15/006; A47D 16/025; A47D 13/025; A47D 15/005; B60N 2/2812; B60N 2/2866; B60N 2/2815; B60N 2/2818
See application file for complete search history.

(56) References Cited

U.S. PATENT DOCUMENTS

| | | | | |
|---|---|---|---|---|
| 6,030,047 A | * | 2/2000 | Kain | B60N 2/2812 |
| | | | | 297/250.1 |
| 6,491,348 B1 | * | 12/2002 | Kain | B60N 2/2812 |
| | | | | 297/250.1 |
| 6,543,847 B2 | * | 4/2003 | Balensiefer | A47D 13/02 |
| | | | | 297/250.1 |

(Continued)

*Primary Examiner* — Syed A Islam
(74) *Attorney, Agent, or Firm* — Eversheds Sutherland (US) LLP (57) ABSTRACT

A child safety seat, such as a car seat, booster seat, stroller seat, or high chair, can include a crotch buckle positioner that provides adjustability for the harness system as the child grows. The seat can include a seat bottom, a seat back, a harness system, and a crotch belt positioner. Crotch belt webbing, including a buckle, can extend up through a portion of the crotch belt positioner and is adjusted by the crotch belt positioner. The crotch belt positioner can be adjusted into multiple positions along the seat bottom. Adjusting the crotch belt positioner from a first position to a second position can adjust at least one of the length of the crotch belt webbing that extends about the top surface of the seat bottom and the position that the relational position that the crotch belt webbing extends up through crotch belt positioner with respect to the seat bottom.

18 Claims, 7 Drawing Sheets

(56) References Cited

U.S. PATENT DOCUMENTS

| | | | | |
|---|---|---|---|---|
| 6,588,849 | B2* | 7/2003 | Glover | A47D 13/02 297/250.1 |
| 7,861,341 | B2* | 1/2011 | Ayette | A61G 1/044 5/621 |
| 8,517,467 | B2* | 8/2013 | Fritz | B60N 2/265 297/250.1 |
| 8,764,108 | B2* | 7/2014 | Gaudreau, Jr. | B60N 2/2851 297/250.1 |
| 8,955,915 | B2* | 2/2015 | Mason | B60N 2/2812 297/467 |
| 9,758,067 | B2* | 9/2017 | Williams | B60N 2/2812 |
| 10,266,077 | B2* | 4/2019 | Mason | B60N 2/2851 |
| 10,293,713 | B2* | 5/2019 | Anderson | B60N 2/286 |
| 10,632,871 | B2* | 4/2020 | Schmitz | B60N 2/2851 |
| 2013/0099536 | A1 | 4/2013 | Mason et al. | |
| 2019/0308529 | A1* | 10/2019 | Maciejczyk | B60N 2/2812 |

* cited by examiner

APPARATUS AND METHOD FOR A CHILD SEAT WITH ADJUSTABLE CROTCH BUCKLE POSITIONER

RELATED APPLICATIONS

This application claims priority under 35 U.S.C. § 119 to U.S. Provisional Patent Application No. 62/694,651 filed Jul. 6, 2018, and titled "APPARATUS AND METHOD FOR A CHILD SAFETY SEAT WITH ADJUSTABLE CROTCH BUCKLE POSITIONER," the entire contents of which are hereby incorporated herein by reference for all purposes.

TECHNICAL FIELD

The present disclosure is generally directed to child seats, and more particularly to an child seat that includes an adjustment mechanism along the seat bottom for adjusting the position of the crotch buckle and webbing.

BACKGROUND

Automobile child safety seats are well-known in the art. These conventional automobile child safety seats have been developed to increase the safety of an infant or child (referred to generically as "child" hereinafter) as the child rides in an automobile. The child safety seat is configured for the child to sit on the child safety seat or lie within the child safety seat such that the position of the child is raised in the vehicle and above the top surface of the vehicle seat bottom. Child safety seats can come in many forms and designs and can include infant carrier seats (ICS), convertible car seats (which can be used in both forward-facing and rear-facing configurations), forward-facing only car seats, and booster seats These automobile child safety seats are designed to be placed on the seat of the automobile. The conventional child safety seat can be coupled to one of the automobile's passenger seat belt systems or via a LATCH (Lower Anchors and Tethers for Children) system to hold the child safety seat in place along the top surface of the automobile seat. In addition, the child safety seat typically includes its own harness restraint system. For example, conventional child safety seats can include a 3-point or 5-point harness for securing the child into the child safety seat. The 3-point harness can include a pair of shoulder straps extending along the seat back of the child safety seat. The shoulder straps can be directly or indirectly coupled to a crotch buckle that is positioned along the seat bottom of the child safety seat and is configured to extend up between the child's legs adjacent the crotch or groin area of the child.

However, as a child grows, there is an ongoing need to adjust the harness restraint system of the child safety seat in order to maintain a proper fit on the child. Depending on the design of the child safety seat and the harness restraint system provided thereon, this might not be possible. Even in situations where it is possible, it is often a time consuming and difficult process. One component that may need adjustment due to the changing size of the child is the position and/or height of the crotch buckle. Unfortunately, many conventional child safety seats do not provide a mechanism for adjusting the position and/or height of the crotch buckle so that it can be adjusted as the size of the child changes in order to properly fit the child as they grow up.

BRIEF DESCRIPTION OF THE SEVERAL VIEWS OF THE DRAWINGS

For a more complete understanding of the present disclosure and certain features thereof, reference is now made to the following description, in conjunction with the accompanying figures briefly described as follows.

DETAILED DESCRIPTION OF THE EXAMPLE EMBODIMENTS

Example embodiments now will be described more fully hereinafter with reference to the accompanying drawings, in which example embodiments are shown. The concepts claimed and described herein may, however, be embodied in many different forms and should not be construed as limited to the example embodiments set forth herein; rather, these embodiments are provided so that this disclosure will be thorough and complete, and will fully convey the scope of the invention to those skilled in the art. Like numbers refer to like, but not necessarily the same, elements throughout.

Certain dimensions and features of the example child safety seat are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions or elements indicates that the equal relationship between the dimensions or elements includes variations that, using mathematical and industrial principles accepted in the art (e.g., rounding, measurement or other systematic errors, manufacturing tolerances, etc.), would not vary the least significant digit of the dimensions or elements. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom. As used herein, the term "substantially orthogonal" or "substantially perpendicular" indicates that the orthogonal relationship is not a strict relationship and does not exclude functionally similar variations therefrom It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Figure 1:
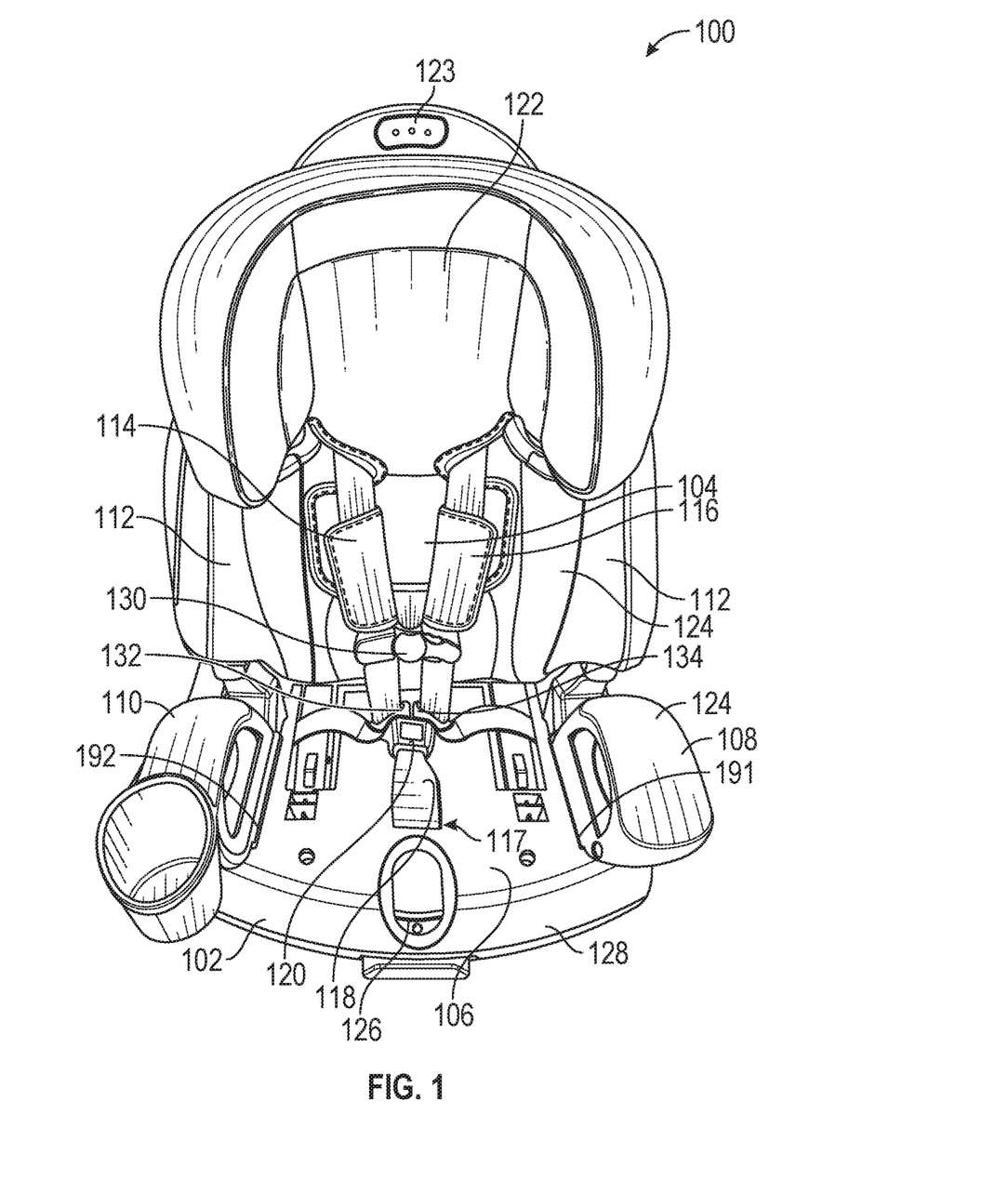
FIG. 1 is a perspective view of child safety seat, in accordance with one example embodiment of the disclosure.

FIG. 1 is a perspective view of a child safety seat 100, in accordance with one example embodiment of the disclosure. While the example embodiment is described herein with regards to a child safety seat, the concepts of the adjustable crotch buckle positioner may also be employed in other child seats including, but not limited to, child high chairs, strollers, and booster seats for dining. Now referring to FIG. 1, the example child car safety seat 100 can include a seat shell 102. In certain example embodiments, the child safety seat 100 can also include a seat base (not shown) disposed beneath the seat shell 102. The seat shell 102 can be configured to be removably coupled to the seat base, if one is included. In other example embodiments, a seat base may not be included and the bottom side of the seat shell 102 can be configured to be positioned directly upon the top surface of the automobile seat.

The seat shell 102 of the child safety seat 100 can be made of any material including, but not limited to, plastic, metal, composite, or any combination thereof. In one example embodiment, at least a portion of the seat shell 102 can be formed of a molded plastic and can include a front side, for receiving a child therein, and an opposing rear side. The front side of the seat shell 102 can include a seat back 104 or backrest and a seat bottom 106, upon which a child can sit. In certain example embodiments, the seat shell 102 can also include a pair of side retaining walls 112 extending generally forward from the seat back 104 at or adjacent to the opposing, vertically-extending, lateral sides of the seat back 104. In one example, the side retaining walls 112 are configured to limit side-to-side movement of the child while in the child safety seat 100 and can be integrally formed with the seat shell 102 or coupled to a portion of the seat bottom 106 or seat back 104. All or a portion of the seat shell 102 can be covered in soft goods 124 (e.g., any combination of padding, fabric, leather, faux leather, mesh, lycra, and/or another material) to provide a protective barrier and increase the comfort level for the child sitting in the child safety seat 100.

The child safety seat 100 can also include a first central adjuster 126 disposed generally along the front side 128 of the seat bottom 106 of the seat shell 102. The first central adjuster 126 can include a slot or passageway disposed through the seat shell 102 of the child safety seat 100 that extends from the front 128 or top side of the seat bottom 106 to a bottom side of the seat bottom 106 under the seat shell 102. In one example, the slot can define an opening to and provide a passageway through the seat shell 102 from the bottom side of the seat bottom 106 to a front side 128 of the seat bottom 106. In certain example embodiments the slot further provides a passageway from the front side 128 of the seat bottom 106 to a rear side of the seat shell 102 (e.g., along the rear side of the seat back 104).

In certain example embodiments, the child safety seat 100 can also include a pair of armrests 108, 110. Each armrest 108, 110 can be positioned above the top surface of the seat bottom 106. For example, each armrest 108, 110 can be coupled to or integrally formed with the seat shell 102 of the child safety seat 100 along opposing lateral sides 191, 192 of the seat bottom 106. Each armrest 108, 110 can also include soft goods 124 (e.g., any combination of padding, fabric, leather, faux leather, lycra, and/or another material) provided at least along a portion of the top side of each armrest 108, 110.

In other example embodiments, in addition or instead of the armrests 108, 110, the seat shell 102 of the child safety seat 100 can include a first side panel extending up from the seat bottom 106 in a vertical or substantially vertical direction along a first lateral side of the seat bottom 106, and a second side panel extending up from the seat bottom 106 in a vertical or substantially vertical direction along a second lateral side opposite the first lateral side of the seat bottom 106. In certain example embodiments, the top end of each of the first side panel and second side panel can further include or define arm rests along to top sides of the first side panel and the second side panel. In one example, the first side panel and second side panel are configured to limit side-to-side movement of hip and leg portions of the child while in the child safety seat 100 and can be integrally formed with the seat shell 102 or separately formed and coupled to a portion of the seat bottom 106 or seat back 104.

The child safety seat 100 can also include a child restraint system. The child restraint system can include at least a pair of shoulder straps or belts 114. 116. Each of the shoulder belts 114, 116 can be made of webbing or other belt-like material and can include a first end and a distal second end. The first end of each shoulder belt 114, 116 can be removably coupled directly or indirectly to the seat shell 102 of the child safety seat 100.

The second end of each the shoulder belt 114, 116 can be coupled to one end of a strap tensioning mechanism. In certain example embodiments, the strap tensioning mechanism can be positioned along the rear side of the seat back 104 of the seat shell 102. For example, each shoulder belt 114, 116 can be fed through one of multiple harness slots (not shown) in the seat back 104 of the seat shell 102. Each harness slot can define a passageway from the front side to the rear side of the seat back 104 of the seat shell 102. In one example, the multiple harness slots can be paired (such that each receives one of the at least two shoulder belts 114, 116) and oriented vertically along the seat back 104 of the seat shell 102 to provide a vertical positioning adjustment for the shoulder belts 114, 116 as they pass from the front side of the seat back 104 to the rear side of the seat back 104. In one example, four pairs of harness slots are oriented vertically along the seat back 104 of the seat shell 102. However, greater or fewer pairs of harness slots can be provided along the seat back 104 in other embodiments.

In one example embodiment, each shoulder belt 114, 116 may be threaded through or otherwise slidably attached to and adjustable along a chest harness 130. In certain example embodiments, the chest harness 130 can be constructed of two pieces that can be removably coupled to one-another. For example, the chest harness can be decoupled to allow a child to be placed within the seat shell 102 of the child safety seat 100. Then, the chest harness 130 can be coupled together to position the shoulder belts 114, 116 along the front side of the upper torso of the child.

Each of the shoulder belts 114, 116, or the chest harness 130, can also include a latch plate 132, 134 that is slidably adjustable along at least a portion of the length of the respective should belt 114, 116. For example, each latch plate 132, 134 can include a slot for receiving the respective shoulder belt 114, 116 therethrough and sliding along or being adjustable (e.g., vertically adjustable) with respect to the shoulder belt 114, 116.

The seat bottom 106 can include a crotch belt positioning system 117. The crotch belt positioning system 117 will be described in greater detail with respect to FIGS. 2A-2E. However, as can be seen in FIG. 1, the crotch belt positioning system 117 can generally include a crotch belt or webbing 118. At least a portion of the crotch belt webbing 118 can extend through an opening in the seat bottom 106 that provides a passageway from the top side of the seat bottom 106 to a bottom side of the seat bottom 106. The crotch belt positioning system 117 can also include a latch plate buckle 120 positioned along one end of the crotch belt webbing 118. The latch plate buckle 120 can be removably coupled to and decoupled from the latch plates 132, 134 that are connected to each of the shoulder belts 114, 116 or chest harness 130.

In certain example embodiments, the child safety seat 100 may be adjustable to fit different children and vehicles. In one example, the child safety seat 100 may also include a vertically adjustable headrest 122 that may be slidably or otherwise vertically adjustably coupled to the seat shell 102 (e.g., the seat back 104) to fit children of different heights. The headrest 122 can include a lever 123 configured to decouple the headrest 122 from the seat shell 102 and allow the headrest 122 to be vertically adjusted up or down with respect to the seat back 104. Releasing the lever 123 can then allow the headrest 122 to lock in one of multiple vertical positions along the seat shell 102.

The seat base (not shown) can include a bottom surface and one or more side walls that extend generally vertically upward from the bottom surface. At least a portion of the side walls can define one or more cavities for receiving a portion of the seat bottom 106 to removably couple the seat bottom 106 to the seat base. In certain example embodiments, the bottom surface of the seat base can be flat or substantially flat or otherwise configured to be positioned directly upon the top surface of the automobile seat. In example embodiments where a seat base is not included, the seat bottom 106 can include a bottom surface that is flat or substantially flat or is otherwise configured to be positioned directly upon the top surface of the automobile seat.

FIGS. 2A-2E provide various views of a crotch belt positioning system 117 for a child safety seat 100, in accordance with one example embodiment of the disclosure. In certain example embodiments, the crotch belt positioning system 117 can be adjusted to a number of different positions along the seat bottom 106 of the child safety seat 100. In these examples, the adjustment of the crotch belt positioning system 117 adjusts both the position of the point at which the crotch belt or webbing 118 extends up from the seat bottom 106 as well as the length of the crotch belt or webbing 118 that extends up from the seat bottom 106. In other example embodiments, only one of the position or length of the crotch belt or webbing 118 extending up from the seat bottom 106 may be adjusted through the use of the crotch belt positioning system 117.

Figure 2A:
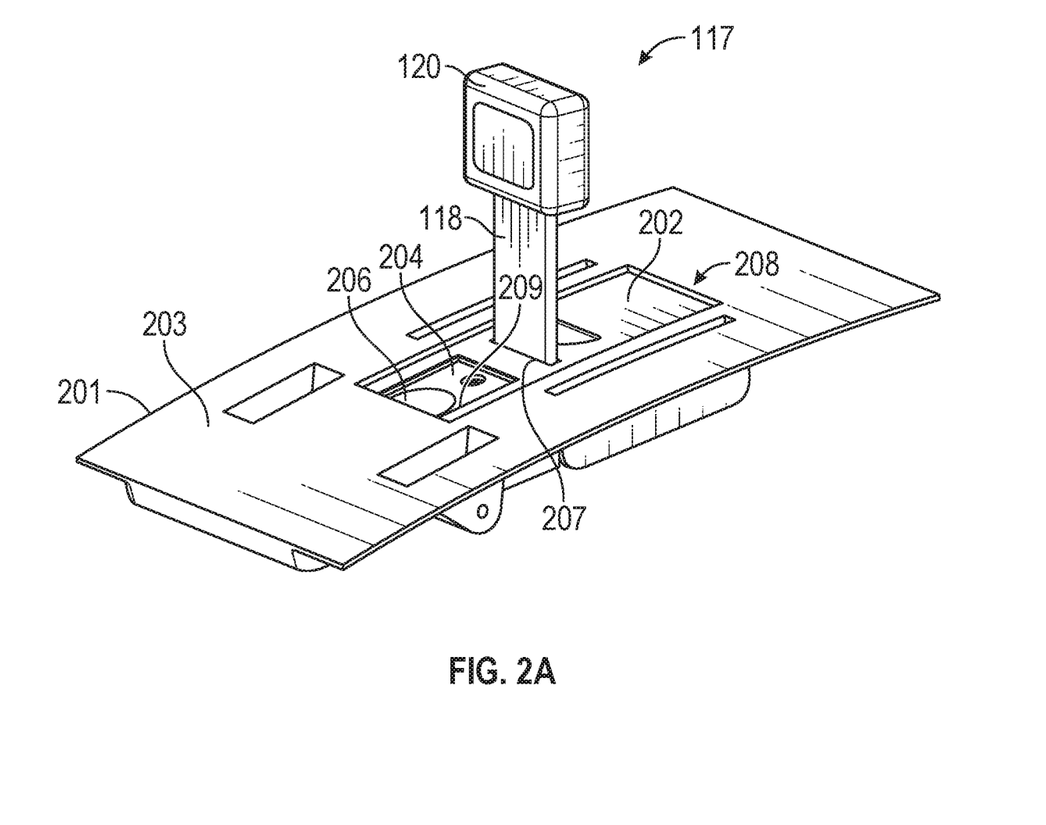
FIG. 2A is a top perspective view of a crotch belt positioning system for a child safety seat, in accordance with one example embodiment of the disclosure.
Figure 2B:
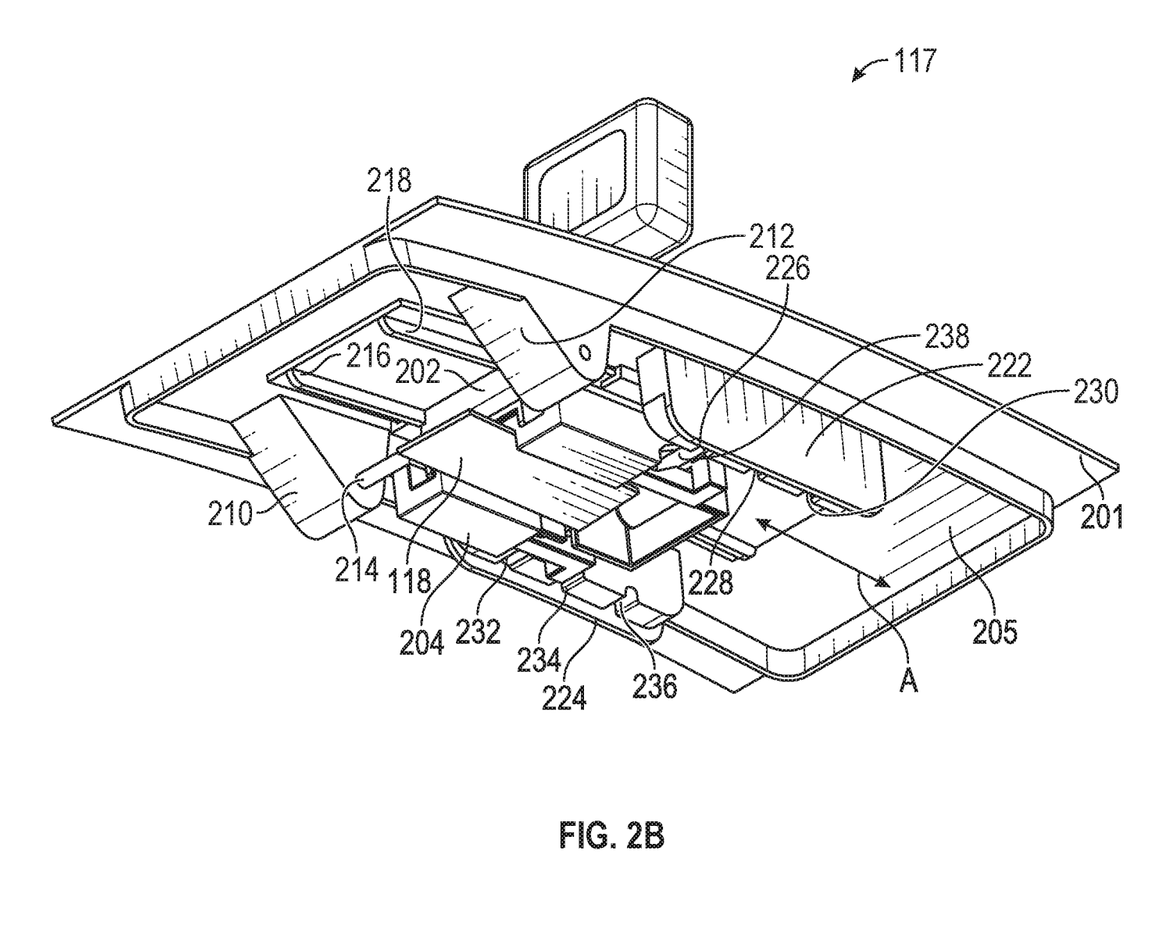
FIG. 2B is a bottom perspective view of the crotch belt positioning system of FIG. 2A, in accordance with one example embodiment of the disclosure.
Figure 2C:
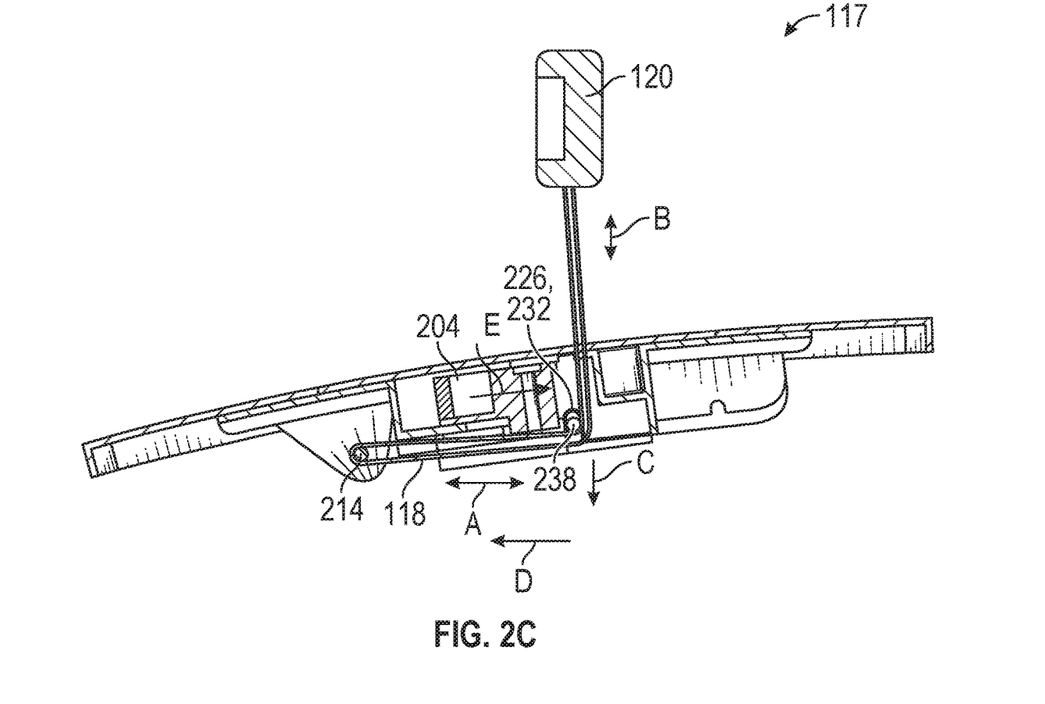
FIG. 2C is a cross-sectional view of the crotch belt positioning system of FIG. 2A, in accordance with one example embodiment of the disclosure.
Figure 2D:
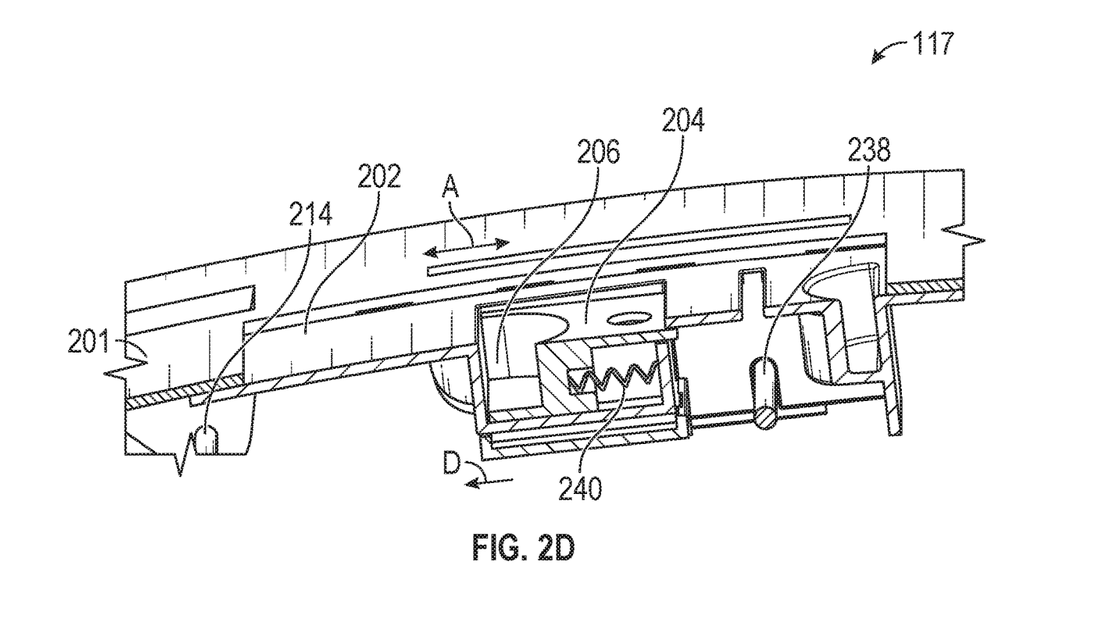
FIG. 2D is a partial cross-sectional view of the actuator mechanism for the crotch belt positioning system of FIG. 2A, in accordance with one example embodiment of the disclosure.
Figure 2E:
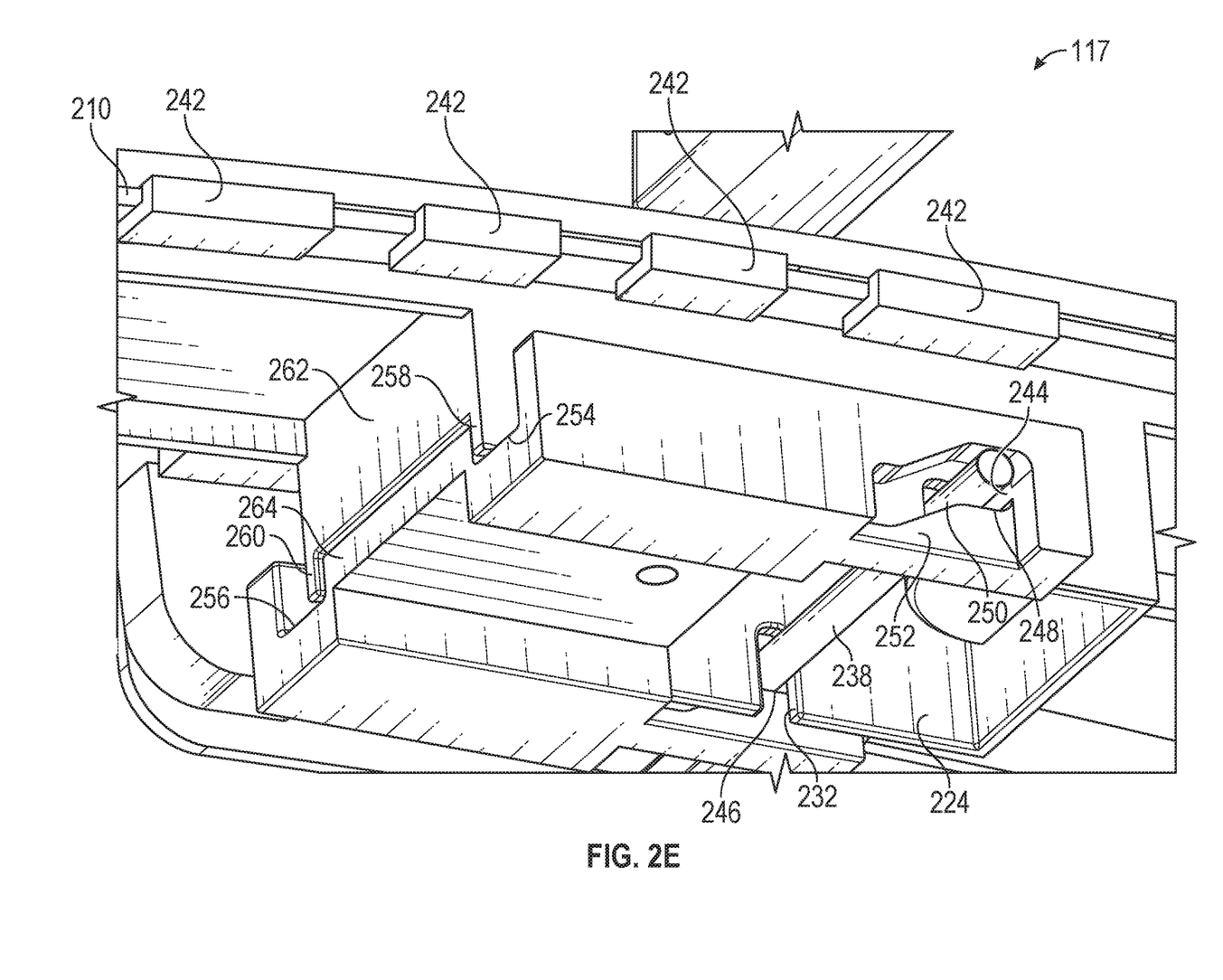
FIG. 2E is partial bottom perspective view of the crotch belt positioning system of FIG. 2A coupled to the seat bottom of the child safety seat, in accordance with one example embodiment of the disclosure.

Referring now to FIGS. 1-2E, the crotch belt positioning system 117 can include a stationary panel 201 and an adjustable panel 202 that moves with respect to the stationary panel 202 along the axis A. In one example embodiment, the stationary panel 201 can also be or include the seat bottom 106 of the child safety seat 100. Alternatively, the stationary panel 201 can be coupled to the seat bottom 106. As shown in FIG. 2E, each lateral side 191, 192 of the seat bottom 106 can include one or multiple retaining tabs 242. Each retaining tab 242 can be configured to slidably receive a portion of the stationary panel member 201 to couple the stationary panel member 201 to the set bottom 106. In one example, multiple retaining tabs 242 can be positioned along each lateral side 191, 192 of the seat bottom 106. Further, in certain example embodiments, each retaining tab 242 can be L-shaped and can extend down from a top end of the seat bottom 106.

The stationary panel member 201 can include an opening 208 that provides a passageway through the stationary panel member 201 from the top surface 203 to the bottom surface 205. The adjustable panel 202 can be positioned along or adjacent this opening 208 so that at least a portion of the adjustable panel 202 can be accessible through the opening 208. The stationary panel member 201 can also include a first mounting plate 210 and a second mounting plate 212 coupled to and extending down from a bottom surface 205 of the stationary panel member 201. In one example, each of the first mounting plate 210 and second mounting plate 212 are integrally formed with the stationary panel member 201. Alternatively, each of the first mounting plate 210 and second mounting plate can be separately formed and attached to the stationary panel member 201.

A webbing mounting member 214 can be positioned below the bottom surface 205 and have a first end coupled to the first mounting plate 210 and a distal second end coupled to the second mounting plate 212. In one example, the webbing mounting member 214 can be fixed in position so as to be stationary with respect to the movement of the adjustable panel 202. Further, at least a portion of the example webbing mounting member 214 can have a rounded or curved outer surface to allow a portion of the crotch belt webbing 118 to slide along when the position of the crotch belt webbing 118 is being adjusted.

The stationary panel member 201 can also include one or more guide rails 216, 218 coupled to and positioned along the bottom surface 205 of the stationary panel member 201. In one example, each of the guide rails 216, 218 are integrally formed with the stationary panel member 201. Alternatively, each guide rail 216, 218 can be separately formed and attached to the stationary panel member 201. Each guide rail 216, 218 can extend along the axis A, the longitudinal axis of the crotch belt positioning system 117, and can be configured to help guide the movement of the adjustable panel 202 with respect to the stationary panel member 201. In one example, two guide rails 216, 218 are provided along the bottom surface 205 of the stationary panel member 201. The guide rails 216, 218 can be thin elongated members that extend down from the bottom surface 205 and each abut a portion of the adjustable panel 202 to ensure that that the adjustable panel 202 generally moves along the axis A.

The stationary panel member 201 can also include a first positioning plate 222 and a second positioning plate 224. Each of the first positioning plate 222 and the second positioning plate 224 can be coupled to and extend down from the bottom surface 205 of the stationary panel member 201. In one example, each of the first positioning plate 222 and second positioning plate 224 are integrally formed with the stationary panel member 201. Alternatively, each of the first positioning plate 222 and second positioning plate 224 can be separately formed and attached to the stationary panel member 201. Each of the first positioning plate 222 and second positioning plate 224 can extend along the axis A and can be parallel or substantially parallel to one another. The first positioning plate 222 and the second positioning plate 224 can be spaced apart a predetermined distance orthogonal to the axis A. The predetermined distance can be such that the adjustable panel 202 or at least a portion of the adjustable panel 202 is positioned between the first positioning plate 222 and the second positioning plate 224. Further, each of the first positioning plate 222 and second positioning plate 224 can be aligned yet spaced apart with one another along the axis A.

The first adjustment plate 222 can include multiple channels or openings for receiving a portion of a movable adjustment member 238 (e.g., a pin or cam follower). The movable adjustment member 238 can be an elongated member having a first end and a distal second end. In certain example embodiments, at least a portion of the movable adjustment member 238 can have a rounded or curved outer surface to allow a portion of the crotch belt webbing 118 to slide along the outer surface of the movable adjustment member 238 when the position of the crotch belt webbing 118 is being adjusted. In one example, the movable adjustment member is cylindrical or substantially cylindrically shaped.

In certain example embodiments, each channel or opening can extend substantially vertically along the first adjustment plate 222. In the example embodiment shown, the first adjustment plate 222 includes a first position aperture 226, a second position aperture 228, and a third position aperture 230. Each of the first position aperture 226, second position aperture 228, and third position aperture 230 are separately positioned along the axis A of the first adjustment plate 222. While three position apertures 226, 228, 230, are shown, this is for example purposes only, as greater or fewer than three position apertures may be provided based on the number of positions desired for moving the crotch belt webbing 118 and buckle 120.

The second adjustment plate 224 can also include multiple channels or openings for receiving a distal second portion of a movable adjustment member 238 (e.g., a pin or cam follower). In certain example embodiments, each channel or opening in the second adjustment plate 224 can extend substantially vertically along the second adjustment plate 222 in a direction orthogonal or substantially orthogonal to the axis A. In the example embodiment shown, the second adjustment plate 224 includes a first position aperture 232, a second position aperture 234, and a third position aperture 236. Each of the first position aperture 232, second position aperture 234, and third position aperture 236 are separately positioned along the axis A of the second adjustment plate 224. Further, the first position aperture 232 can be aligned with the first position aperture 226 along the axis A, the second position aperture 234 can be aligned with the second position aperture 228 along the axis A, and the third position aperture 236 can be aligned with the third position aperture 230 along the axis A.

In certain example embodiments, when the crotch belt positioning system 117 is moved to a first position, one end of the movable adjustment member 238 can extend into the first position aperture 226 and the distal second end of the movable adjustment member 238 can extend into the first position aperture 232 and prevent movement of the adjustable panel 202 with respect to the stationary panel member 201. Further, when the crotch belt positioning system 117 is moved to a second position along the axis A with respect to the first position, one end of the movable adjustment member 238 can extend into the second position aperture 228 and the distal second end of the movable adjustment member 238 can extend into the second position aperture 234 and prevent movement of the adjustable panel 202 with respect to the stationary panel member 201. In addition, when the crotch belt positioning system 117 is moved to a third position along the axis A with respect to the first and second positions, one end of the movable adjustment member 238 can extend into the third position aperture 230 and the distal second end of the movable adjustment member 238 can extend into the third position aperture 236 and prevent movement of the adjustable panel 202 with respect to the stationary panel member 201. While three position apertures 226, 228, 230, and 232, 234, 236 are shown for each of the first positioning plate 222 and second positioning plate 224 respectfully, this is for example purposes only, as greater or fewer than three position apertures may be provided based on the number of positions desired for moving the crotch belt webbing 118 and buckle 120.

The adjustable panel 202 can be positioned below the top surface 203 of the stationary panel member 201. The adjustable panel 202 can include a top surface and an opposing bottom surface. The adjustable panel 202 can also include a belt aperture 207 through the adjustable panel 202 that extends from the top surface towards the bottom surface. The belt aperture 207 is configured to receive a portion of the crotch belt webbing 118 therethrough. In one example, the belt aperture 207 is an elongated opening have a width greater than the width of the crotch belt webbing 118 but less than the width of the buckle 120. As such, the crotch belt webbing 118 is movable through the belt aperture 207 but the buckle 120 is too large to fit through the belt aperture 207 thereby maintaining the buckle above the top surface of the adjustable panel 202 and above the top surface of the seat bottom 106.

The adjustable panel 202 can also include an actuator opening 209. In one example, the actuator opening 209 provides a passageway through the adjustable panel 202 from the top surface towards the bottom surface of the adjustable panel 202. An actuator 204 can be operably coupled to the adjustable panel 202 and can be positioned along or adjacent this opening 209 so that at least a portion of the actuator 204 can be accessible through the actuator opening 209 and the opening 208 in the stationary panel member 201.

The adjustable panel 202 can also include a retaining cavity along a bottom side of the adjustable panel 202 for retaining a movable adjustment member 238 with the adjustable panel 202. The adjustable panel 202 can also include a first rail arm 258 and a second rail arm 260. In one example, each of the first rail arm 258 and second rail arm 260 can be coupled to and positioned along the bottom surface 205 of the stationary panel member 201. In one example, each of the rail arms 258, 260 are integrally formed with the adjustable panel 202. Alternatively, each rail arm 258, 260 can be separately formed and attached to the adjustable panel 202. Each rail arm 258, 260 can be separated from one another and extend along the axis A. Each of the rail arms 258, 260 can be configured to help guide the movement of the actuator 204 with respect to the adjustable panel 202. In one example, two rail arms 258, 260 are provided along opposing lateral sides of the adjustable panel 202. In one example, each of the first rail arm 258 and the second rail arm 260 can be a thin elongated member that extends down from the bottom surface of the adjustable panel 202 and abuts a portion of the actuator 204 to ensure that that the actuator 204 moves along the axis A. To further ensure proper movement of the actuator 204 along the axis A, the adjustable panel 202 can also include a channel or recessed area 262 extending along the axis A along the bottom side of the adjustable panel 202. The channel 262 can be configured to slidably receive a rail member 264 on the actuator 204. In operation, the rail member 264 of the actuator 204 slides along the channel 262 of the adjustable panel along the axis A between the first rail arm 258 and the second rail arm 260.

The actuator 204 can be any form of mechanism for activating the crotch belt positioning system 117, including, but not limited to, a push-button, a rotary switch, a knob, a slider, a pull-switch, or the like. In one example, the actuator 204 is a slider, as shown in FIGS. 2A-2E. The actuator 204 can be movable with respect to the adjustable panel 202 from a first position, where the movable adjustment member 238 engages a pair of position apertures 226, 232; or 228, 234; or 230, 236, to a second position, where the movable adjustment member 238 is disengaged or removed from the respective pair of position apertures. Further, the actuator 204 is also movable with respect to the stationary panel member 201 (e.g., the seat bottom 106).

The actuator 204 can also include a cavity 206 positioned along and accessible from a top side of the actuator 204. In one example, the cavity 206 can be sized and shaped to receive all or at least a portion of a person's finger therein to provide a force against the side wall of the cavity 206 in the direction E to move the actuator 204 from the first position where the movable adjustment member 238 engages a pair of position apertures 226, 232; or 228, 234; or 230, 236, to a second position, where the movable adjustment member 238 is disengaged or removed from the pair of position apertures and the actuator 204 and/or the adjustable panel 202 can move along the axis A with respect to the stationary panel member 201. In one example, the force provided to move the actuator 204 from the first position to the second position is at least 3 pounds-force and more preferably at least 5 pounds-force, and ever more preferably at least 6 pounds-force.

In certain example embodiments, the actuator 204 is biased in the direction D into the first position by a biasing means 240. In one example, the biasing means 240 is a compression spring. In other example embodiments, the biasing means 240 can be another type of spring (e.g., a leaf spring, a torsion spring, etc.), an elastic material (e.g., a rubber band, rubberized member), or the like. The biasing means 240 can have a first end coupled to or abutting the actuator 204 and a distal second end coupled to or abutting the adjustable panel 202. As such, when a force is not being applied by a user to the actuator 204 in the direction E, the actuator 204 will remain in the first position. Furthermore, once a user adjusts the actuator 204 in the direction E into the second position and discontinues applying a force on the actuator 204 or the force is less than the required minimal amount, then the biasing means 240 will move the actuator 204 in the direction D back to the first position.

The actuator 204 can also include one or more cams, guides, or mechanisms 244, 246 for guiding or adjusting the movable adjustment member 238 out of and into one of the pair of position apertures 226, 232; or 228, 234; or 230, 236. In one example, the cams, guides, or mechanisms 244, 246 can take the form of slots or apertures 244, 246 provided through a first side wall and a second, opposing side wall of the actuator 204. In one example embodiment, the slot or aperture 244, 246 can have a shape configured to adjust the movable adjustment member 238 out of and into one of the pair of position apertures 226, 232; or 228, 234; or 230, 236. For example, the shape of the slot or aperture 244 can include a first horizontal or substantially horizontal section 248 at a first vertical level, a second horizontal or substantially horizontal section 252 at a second vertical level less than the first vertical level, and an angled section 250 extending from the first section 248 to the second section 252. However, this shape is for example purposes only as many other shapes could be used to adjust the movable adjustment member 238 out of and into engagement with one of the pair of position apertures 226, 232; or 228, 234; or 230, 236.

The actuator 204 can also include a first channel 254 and a second channel 256 disposed along the top surface of the actuator 204. Each of the first channel 254 and second channel 256 can extend along the axis A along all or substantially the entire length of the actuator 204. The first channel 254 can be configured to receive the first rail arm 258 therein and the second channel 256 can be configured to receive the second rail arm 260 therein. In one example operation, the first channel 254 can slide along the first rail arm 258 and the second channel 256 can slide along the second rail arm 260 as the actuator 204 is moved between the first position and the second position.

As discussed above with reference to FIG. 1, a crotch belt webbing 118 can have a first end coupled to the buckle 120. The crotch belt webbing 118 can extend through the belt aperture 207 to be below the top surface of the seat bottom 106. In one example, the crotch belt webbing 118 can then be routed around the movable adjustment member 238 and the second end of the crotch belt webbing 118 can be coupled to the fixed webbing mounting member 214. The length of the crotch belt webbing 118 can be fixed, such that, as more of the crotch belt webbing 118 is maintained below the top surface of the seat bottom 106, the less the crotch belt webbing 118 can extend about the top surface of the seat bottom 106.

Figure 3A:
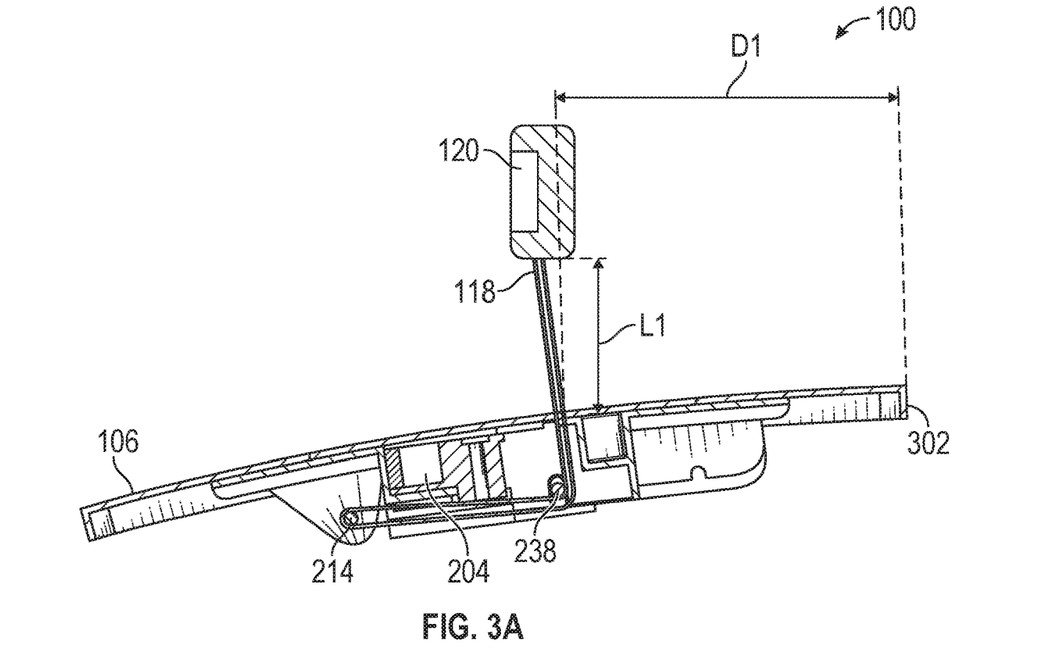
FIG. 3A is a partial cross-sectional view of the child safety seat with the crotch belt webbing and buckle of the crotch belt positioning system in a first position, in accordance with one example embodiment of the disclosure.
Figure 3B:
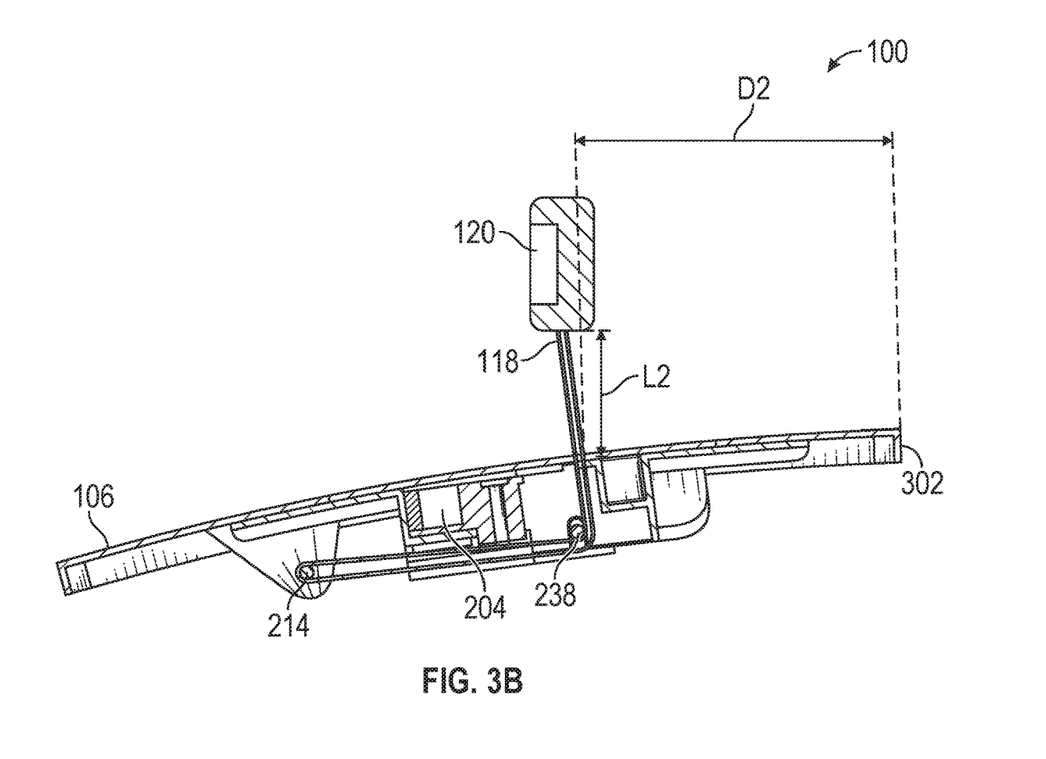
FIG. 3B is a partial cross-sectional view of the child safety seat with the crotch belt webbing and buckle of the crotch belt positioning system in a second position, in accordance with one example embodiment of the disclosure.
Figure 3C:
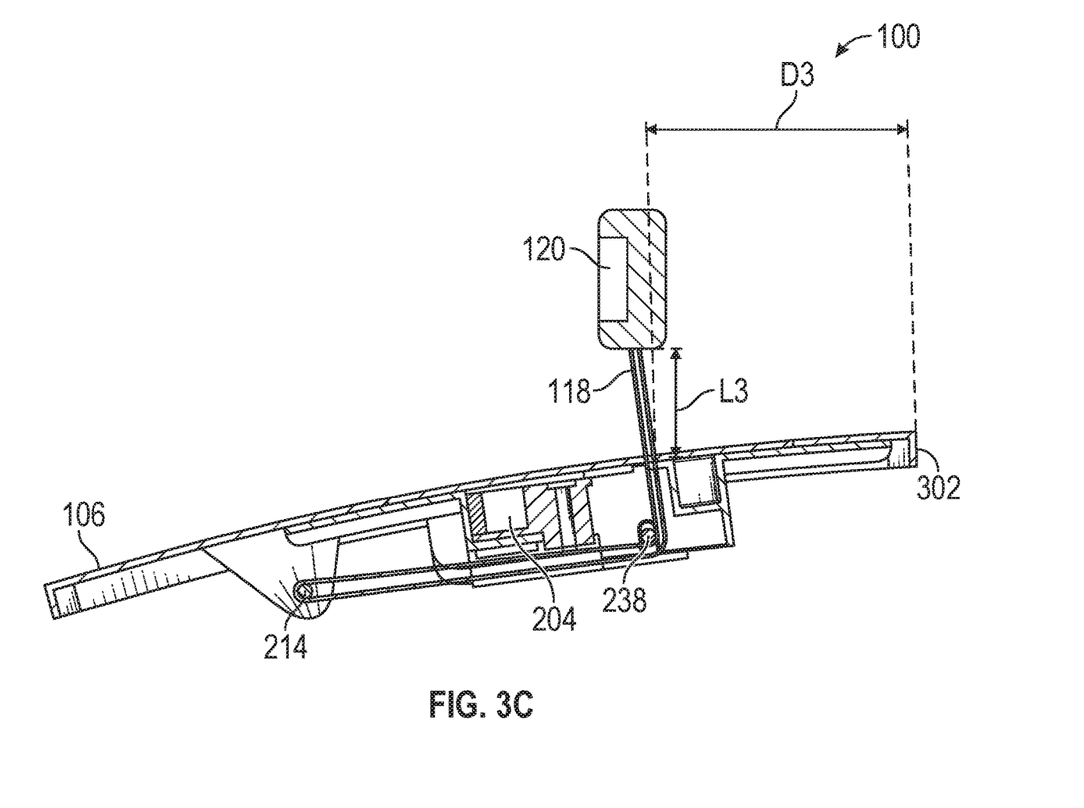
FIG. 3C is a partial cross-sectional view of the child safety seat with the crotch belt webbing and buckle of the crotch belt positioning system in a third position, in accordance with one example embodiment of the disclosure

FIGS. 3A-3C are partial cross-sectional views of the child safety seat 100 showing the movement of the crotch belt webbing 118 and buckle 120 of the crotch belt positioning system 117 into various positions, in accordance with one example embodiment of the disclosure. Referring now to FIGS. 1-3C, FIG. 3A shows the crotch belt positioning system 117 in a first position, where the movable adjustment member 238 is positioned in or otherwise engages the first position apertures 226, 232 to prevent movement of the adjustable panel 202 with respect to the stationary panel member 201. In the first position, point of entry (e.g., the belt aperture 207) for the crotch belt webbing 118 passing from beneath the top surface of the seat bottom 106 to above the top surface of the seat bottom 106 is a first distance D1 from the back edge 302 of the seat bottom. Also in the first position, the length of the crotch belt webbing 118 that extends above the top surface of the seat bottom is a first length L1.

To adjust the crotch belt positioning system 117 from the first position to the second position, a user can activate the actuator 204 by inserting their finger or another portion of their body into the cavity 206 of the actuator 204 and provide a sufficient force to move the actuator 204 with respect to both the stationary panel member 201 and the adjustable panel 202 in the direction E along the axis A. As the actuator is moved in the direction E, the movable adjustment member 138 rides along the cams, guides, or mechanisms 244, 246 from the first horizontal section 244 towards the second horizontal section 252, which allows the movable adjustment member 138 to move vertically downward in the direction C. Once the movable adjustment member 138 moves far enough down in the direction C to exit the first position apertures 226, 232, the actuator 204, adjustable panel 202, and the movable adjustment member 138 can be moved along the axis A with respect to the stationary panel member 201 and the rest of the seat bottom 106, which do not move. For instance, the actuator 204, adjustable panel 202, and the movable adjustment member 138 can be moved along the axis A in the direction E towards the back edge 302 of the seat bottom 106. As the biasing member 240 applies a force to try and move the actuator in the direction D, it will cause the cams, guides, or mechanisms 244, 246 to try and push the movable adjustment member 138 up in the direction opposite C. When the movable adjustment member 138 is moved a predetermined distance in the direction E to get to the second position apertures 228, 234, the force of the cams, guides, or mechanisms 244, 246 with push the ends of the movable adjustment member 138 into the second position apertures 228, 234 to prevent further movement of the adjustable panel 202 and the movable adjustment member 138 along the axis A in the direction E and position the crotch belt webbing 118 and the buckle 120 of the crotch belt positioning system 117 in the second position.

FIG. 3B shows the crotch belt webbing 118 and the buckle 120 of the crotch belt positioning system 117 in the second position, where the movable adjustment member 238 is positioned in or otherwise engages the second position apertures 228, 234. In the second position, the point of entry (e.g., the belt aperture 207) for the crotch belt webbing 118 passing from beneath the top surface of the seat bottom 106 to above the top surface of the seat bottom 106 is a second distance D2 from the back edge 302 of the seat bottom. The second distance D2 is less than the first distance D1. Also in the second position, the length of the portion of the crotch belt webbing 118 that extends above the top surface of the seat bottom 106 is a second length L2. The second length L2 is less than the first length L1. Accordingly, moving the crotch belt positioning system 117 from the first position to the second position moves the portion of the crotch belt webbing 118 and buckle 120 that extends above the seat bottom 106 in the direction C towards the back edge 302 of the seat bottom 106 and also reduces the length of the portion of the crotch belt webbing 118 that extends above the top surface of the seat bottom 106. This reduction in length between L1 and L2 is caused by the distance between the webbing mounting member 118 and the movable adjustment member 138 increasing when the movable adjustment member 138 is adjusted from the first position apertures 226, 232 to the second position apertures 228, 234.

To adjust the crotch belt positioning system 117 from the second position to the third position, a user can once again activate the actuator 204 by inserting their finger or another portion of their body or a separate device into the cavity 206 of the actuator 204 and providing a sufficient force to overcome the biasing member 240 and moving the actuator 204 with respect to both the stationary panel member 201 and the adjustable panel 202 in the direction E along the axis A. As the actuator 204 is moved in the direction E, the movable adjustment member 138 rides along the cams, guides, or mechanisms 244, 246 from the first horizontal section 244 towards the second horizontal section 252, which allows the movable adjustment member 138 to move vertically downward in the direction C. Once the movable adjustment member 138 moves far enough down in the direction C to exit the second position apertures 228, 234, the actuator 204, adjustable panel 202, and the movable adjustment member 138 can be moved along the axis A with respect to the stationary panel member 201 and the rest of the seat bottom 106, which do not move. For instance, the actuator 204, adjustable panel 202, and the movable adjustment member 138 can be moved along the axis A in the direction E towards the back edge 302 of the seat bottom 106. As the biasing member 240 applies a force to try and move the actuator 204 in the direction D, it will cause the cams, guides, or mechanisms 244, 246 to try and push the movable adjustment member 138 up in the direction opposite C. When the movable adjustment member 138 is moved a predetermined distance in the direction E to get to the third position apertures 230, 236, the force of the cams, guides, or mechanisms 244, 246 will push movable adjustment member 138 in the direction opposite C so that the ends of the movable adjustment member 138 are moved into the third position apertures 230, 236 to prevent further movement of the adjustable panel 202 and the movable adjustment member 138 along the axis A in the direction E and position the crotch belt webbing 118 and the buckle 120 of the crotch belt positioning system 117 in the third position.

FIG. 3C shows the crotch belt webbing 118 and the buckle 120 of the crotch belt positioning system 117 in the third position, where the movable adjustment member 238 is positioned in or otherwise engages the third position apertures 230, 236. In the third position, the point of entry (e.g., the belt aperture 207) for the crotch belt webbing 118 passing from beneath the top surface of the seat bottom 106 to above the top surface of the seat bottom 106 is a third distance D3 from the back edge 302 of the seat bottom. The third distance D3 is less than the first distance D1 and the second distance D2. Also in the third position, the length of the portion of the crotch belt webbing 118 that extends above the top surface of the seat bottom is a third length L3. The third length L3 is less than the first length L1 and the second length L2. Accordingly, moving the crotch belt positioning system 117 from the second position to the third position moves the portion of the crotch belt webbing 118 and buckle 120 that extends above the seat bottom 106 in the direction C towards the back edge 302 of the seat bottom 106 and also reduces the length of the portion of the crotch belt webbing 118 that extends above the top surface of the seat bottom 106. This reduction in length between L2 and L3 is caused by the distance between the webbing mounting member 118 and the movable adjustment member 138 increasing when the movable adjustment member 138 is adjusted from the second position apertures 228, 234 to the third position apertures 230, 236.

As discussed above, while the example embodiment describes three positions for the crotch belt positioning system, this is for example only as any number of positions and single or pairs of position apertures can be designed into the crotch belt adjustment system 117. In addition, the crotch belt adjustment system 117 can be adjusted to increase the distance D3 to D2 and/or D2 to D1 and the length from L3 to L2 and/or L2 to L1 by moving the system 117 from the third position to the second position, the third position to the first position, or the second position to the first position in substantially the same manner as described above, with some movements occurring in the opposite direction.

Though the disclosed example includes a particular arrangement of a number of parts, components, features, and aspects, the disclosure is not limited to only that example or arrangement. Any one or more of the parts, components, features, and aspects of the disclosure can be employed alone or in other arrangements of any two or more of the same.

Although certain child safety seat features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

In example 1 of the disclosure there may be a child seat. In example 2 of the disclosure, the child seat of example 1 can be a child safety seat. In example 3 of the disclosure, the child seat of any one of examples 1-2 can include a seat bottom. In example 4 of the disclosure, the seat bottom of the child seat of any one of examples 1-3 can include a top surface, a front end, and an opposing back end. In example 5 of the disclosure, the child seat of any one of examples 1-4 can include a seat back. In example 6 of the disclosure, the child seat of any one of examples 1-5 can include a first pair of shoulder belts extending along a front side of the seat back. In example 7 of the disclosure, the child seat of any one of examples 1-6 can include a crotch belt positioner. In example 8 of the disclosure, the crotch belt positioner of any one of examples 1-7 can be operably coupled to the seat bottom. In example 9 of the disclosure, the crotch belt positioner of any one of examples 1-8 can include a belt aperture. In example 10 of the disclosure, the crotch belt positioner of any one of examples 1-9 can be adjustable from a first position to a second position. In example 11 of the disclosure, the child seat of any one of examples 1-10 can include a crotch belt webbing that extends through the belt aperture and has first portion that extends above the top surface of the seat bottom a first length when the crotch belt positioner is in the first position. In example 12 of the disclosure, the child seat of any one of examples 1-11 can include adjustment of the crotch belt positioner from the first position to the second position that adjusts at least one of a length of the first portion of the crotch belt webbing that extends above the top surface of the seat bottom and a distance between the belt aperture and the back end of the seat bottom. In example 13 of the disclosure, the child seat of any one of examples 1-12 can include the first portion of the crotch belt webbing extends above the top surface of the seat bottom a second length when the crotch belt positioner is in the second position, with the second length being less than the first length in when the crotch belt positioner is in the first position. In example 14 of the disclosure, the child seat of any one of examples 1-13 can include wherein when the crotch belt positioner is in the first position, a distance from the belt aperture to the back end of the seat bottom is a first distance, and when the crotch belt positioner is in the second position, the distance from the belt aperture to the back end of the seat bottom is a second distance that is less than the first distance. In example 15 of the disclosure, the child seat of any one of examples 1-14 can include the crotch belt positioner being further adjustable from the second position to a third position. In example 16 of the disclosure, the child seat of any one of examples 1-15 can include the adjustment of the crotch belt positioner from the second position to the third position adjusting at least one of the length of the first portion of the crotch belt webbing that extends above the top surface of the seat bottom and the distance between the belt aperture and the back end of the seat bottom. In example 17 of the disclosure, the child seat of any one of examples 1-16 can include, when the crotch belt positioner is in the third position, the first portion of the crotch belt webbing that extends above the top surface of the seat bottom has a third length that is less than the first length and the second length and the distance between the belt aperture to the back end of the seat bottom is a third distance that is less than the first distance and the second distance. In example 18 of the disclosure, the crotch belt positioner of the child seat of any one of examples 1-17 can include a first positioner plate disposed below the top surface of the seat bottom, the first positioner plate including a first position aperture and a second position aperture; a second positioner plate disposed below the top surface, the second positioner plate including a third position aperture and a fourth position aperture; and an adjustment member operable to engage the first position plate and the second position plate. In example 19 of the disclosure, the child seat of any one of examples 1-18 can include the adjustment member engaging the first position aperture and the third position aperture when the adjustment member is in the first position and engaging the second position aperture and the fourth position aperture when the adjustment member is in the second position. In example 20 of the disclosure, the child seat of any one of examples 1-19 can include an actuator operably coupled to the crotch belt positioner and adjustable from a first actuator position to a second actuator position. In example 21 of the disclosure, the child seat of any one of examples 1-20 can include the actuator including at least one cam, wherein the adjustment member extends through the at least one cam and wherein in the second actuator position, the at least one cam disengages the adjustment member from the first positioner plate and the second positioner plate. In example 22 of the disclosure, the child seat of any one of examples 1-21 can include the crotch belt positioner being disposed below the top surface of the seat bottom. In example 23 of the disclosure, the child seat of any one of examples 1-22 can include the crotch belt webbing having a first end coupled to the seat bottom and a distal second end coupled to a buckle. In example 24 of the disclosure, the child seat of any one of examples 1-23 can include the child seat being one of an infant carrier seat, car seat, high chair, stroller seat, or booster seat.

In example 25 of the disclosure there may be a child car safety seat. In example 26 of the disclosure, the child car safety seat of example 25 can include a seat bottom. In example 27 of the disclosure, the seat bottom of the child car safety seat of any one of examples 25-26 can include a top surface, a front end, and an opposing back end. In example 28 of the disclosure, the child car safety seat of any one of examples 25-27 can include a seat back. In example 29 of the disclosure, the child car safety seat of any one of examples 25-28 can include a shoulder belt harness extending along a front side of the seat back. In example 30 of the disclosure, the child car safety seat of any one of examples 25-29 can include a crotch belt positioner operably coupled to the seat bottom. In example 31 of the disclosure, the crotch belt positioner of the child car safety seat of any one of examples 25-30 can be adjustable from a first position to a second position. In example 32 of the disclosure, the crotch belt positioner of the child car safety seat of any one of examples 25-31 can include a belt aperture for receiving webbing therethrough, wherein in the first position a distance from the belt aperture to the back end of the seat bottom is a first distance. In example 33 of the disclosure, the child car safety seat of any one of examples 25-32 can include a crotch belt webbing that includes a first portion extending through the belt aperture. In example 34 of the disclosure, the child car safety seat of any one of examples 25-33 can include when the crotch belt positioner is in the second position, the distance between the belt aperture to the back end of the seat bottom is a second distance that is less than the first distance. In example 35 of the disclosure, the child car safety seat of any one of examples 25-34 can include the crotch belt webbing having a first portion that extends above the top surface of the seat bottom a first length when the crotch belt positioner is in the first position and wherein in the second position the first portion of the crotch belt webbing extends above the top surface of the seat bottom a second length that is less than the first length. In example 36 of the disclosure, the child car safety seat of any one of examples 25-35 can include the crotch belt positioner being further adjustable from the second position to a third position, wherein when the crotch belt positioner is in the third position, the first portion of the crotch belt webbing that extends above the top surface of the seat bottom has a third length that is less than the first length and the second length, and the distance between the belt aperture to the back end of the seat bottom is a third distance that is less than the first distance and the second distance. In example 37 of the disclosure, the child car safety seat of any one of examples 25-36 can include the crotch belt positioner being further adjustable from the second position to a third position, wherein when the crotch belt positioner is in the third position, the distance between the belt aperture to the back end of the seat bottom is a third distance that is less than the first distance and the second distance. In example 38 of the disclosure, the child car safety seat of any one of examples 25-37 can include a spring-biased actuator operably coupled to the crotch belt positioner and configured to adjust the crotch belt positioner from a locked position, wherein a portion of the crotch belt positioner is not movable with respect to the seat bottom to an unlocked position, wherein the portion of the crotch belt positioner is movable with respect to the seat bottom. In example 39 of the disclosure, the crotch belt positioner for the child car safety seat of any one of examples 25-38 can include a first positioner plate coupled to the seat bottom and disposed below the top surface, the first positioner plate having a first position aperture and a second position aperture; a second positioner plate coupled to the seat bottom and disposed below the top surface, the second positioner plate comprising a third position aperture and a fourth position aperture; and an adjustment member operable to engage the first position aperture and the third position aperture when the crotch belt positioner is in the first position and engage the second position aperture and the fourth position aperture when the crotch belt positioner is in the second position. In example 40 of the disclosure, the child car safety seat of any one of examples 25-39 can include the crotch belt webbing having a first end coupled to the seat bottom and a distal second end coupled to a buckle.

In example 41 of the disclosure there may be a child seat. In example 42 of the disclosure, the child seat of example 41 can include a seat bottom. In example 43 of the disclosure, the seat bottom of the child seat of any one of examples 41-42 can include a top surface, a front end, and an opposing back end. In example 44 of the disclosure, the child seat of any one of examples 41-43 can include a seat back that includes a front side and opposing back side. In example 45 of the disclosure, the child seat of any one of examples 41-44 can include a shoulder belt harness extending along a front side of the seat back. In example 46 of the disclosure, the child seat of any one of examples 41-45 can include a crotch belt positioner operably coupled to the seat bottom. In example 47 of the disclosure, the crotch belt positioner of the child seat of any one of examples 41-46 can be adjustable from a first position to a second position. In example 48 of the disclosure, the crotch belt positioner of the child seat of any one of examples 41-47 can include a belt aperture for receiving webbing therethrough, wherein in the first position a distance from the belt aperture to the back end of the seat bottom is a first distance. In example 49 of the disclosure, the child seat of any one of examples 41-48 can include crotch belt webbing that includes a first portion extending through the belt aperture and having a first length that extends above the top surface of the seat bottom when the crotch belt positioner is in the first position. In example 50 of the disclosure, the child seat of any one of examples 41-49 can include, when the crotch belt positioner is in the second position, the first portion of the crotch belt webbing extends above the top surface of the seat bottom at a second length that is less than the first length and the distance between the belt aperture to the back end of the seat bottom is a second distance that is less than the first distance.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A child seat comprising:
   a seat bottom comprising a top surface, a front end and an opposing back end;
   a seat back;
   a first pair of shoulder belts extending along a front side of the seat back;
   a crotch belt positioner operably coupled to the seat bottom and comprising a belt aperture, wherein the crotch belt positioner is adjustable from a first position to a second position, wherein the crotch belt positioner further comprises:
   a first positioner plate disposed below the top surface of the seat bottom, the first positioner plate comprising a first position aperture and a second position aperture;
   a second positioner plate disposed below the top surface, the second positioner plate comprising a third position aperture and a fourth position aperture; and an adjustment member operable to engage the first position plate and the second position plate; and a crotch belt webbing extending through the belt aperture and having first portion that extends above the top surface of the seat bottom a first length when the crotch belt positioner is in the first position, wherein adjustment of the crotch belt positioner from the first position to the second position adjusts a distance between the belt aperture and the back end of the seat bottom.

2. The child seat of claim 1, wherein in the second position the first portion of the crotch belt webbing extends above the top surface of the seat bottom a second length that is less than the first length.

3. The child seat of claim 2, wherein in the first position, a distance from the belt aperture to the back end of the seat bottom is a first distance, and in the second position, the distance from the belt aperture to the back end of the seat bottom is a second distance that is less than the first distance.

4. The child seat of claim 3, wherein the crotch belt positioner is further adjustable from the second position to a third position, wherein adjustment of the crotch belt positioner from the second position to the third position adjusts at least one of the length of the first portion of the crotch belt webbing that extends above the top surface of the seat bottom and the distance between the belt aperture and the back end of the seat bottom.

5. The child seat of claim 4, wherein when the crotch belt positioner is in the third position, the first portion of the crotch belt webbing that extends above the top surface of the seat bottom has a third length that is less than the first length and the second length and the distance between the belt aperture to the back end of the seat bottom is a third distance that is less than the first distance and the second distance.

6. The child seat of claim 1, wherein in the first position the adjustment member engages the first position aperture and the third position aperture; and in the second position, the adjustment member engages the second position aperture and the fourth position aperture.

7. The child seat of claim 1, further comprising an actuator operably coupled to the crotch belt positioner and adjustable from a first actuator position to a second actuator position.

8. The child seat of claim 7, wherein the actuator comprises at least one mechanism, wherein the adjustment member extends through the at least one mechanism; and wherein in the second actuator position, the at least one mechanism disengages the adjustment member from the first positioner plate and the second positioner plate.

9. The child seat of claim 1, wherein the crotch belt positioner is disposed below the top surface of the seat bottom.

10. The child seat of claim 1, wherein the crotch belt webbing comprises a first end coupled to the seat bottom and a distal second end coupled to a buckle.

11. The child seat of claim 1, wherein the child seat is one of an infant carrier seat, car seat, high chair, stroller seat, or booster seat.

12. A child car safety seat comprising:
a seat bottom comprising a top surface, a front end and an opposing back end;
a seat back;
a shoulder belt harness extending along a front side of the seat back;
a crotch belt positioner operably coupled to the seat bottom and adjustable from a first position to a second position, the crotch belt positioner comprising a belt aperture for receiving webbing therethrough, wherein in the first position a distance from the belt aperture to the back end of the seat bottom is a first distance, wherein the crotch belt positioner further comprises:
a first positioner plate coupled to the seat bottom and disposed below the top surface, the first positioner plate comprising a first position aperture and a second position aperture;
a second positioner plate coupled to the seat bottom and disposed below the top surface, the second positioner plate comprising a third position aperture and a fourth position aperture; and
an adjustment member operable to engage the first position aperture and the third position aperture when the crotch belt positioner is in the first position and engage the second position aperture and the fourth position aperture when the crotch belt positioner is in the second position;
a crotch belt webbing comprising a first portion extending through the belt aperture; and
wherein in the second position the distance between the belt aperture to the back end of the seat bottom is a second distance less than the first distance.

13. The child car safety seat of claim 12, wherein the crotch belt webbing has a first portion that extends above the top surface of the seat bottom a first length when the crotch belt positioner is in the first position and wherein in the second position the first portion of the crotch belt webbing extends above the top surface of the seat bottom a second length that is less than the first length.

14. The child car safety seat of claim 13, wherein the crotch belt positioner is further adjustable from the second position to a third position, wherein when the crotch belt positioner is in the third position, the first portion of the crotch belt webbing that extends above the top surface of the seat bottom has a third length that is less than the first length and the second length, and the distance between the belt aperture to the back end of the seat bottom is a third distance that is less than the first distance and the second distance.

15. The child car safety seat of claim 12, wherein the crotch belt positioner is further adjustable from the second position to a third position, wherein when the crotch belt positioner is in the third position, the distance between the belt aperture to the back end of the seat bottom is a third distance that is less than the first distance and the second distance.

16. The child safety seat of claim 12, further comprising a spring-biased actuator operably coupled to the crotch belt positioner and configured to adjust the crotch belt positioner from a locked position, wherein the crotch belt positioner is not movable with respect to the seat bottom to an unlocked position, wherein the crotch belt positioner is movable with respect to the seat bottom.

17. The child car safety seat of claim 12, wherein the crotch belt webbing comprises a first end coupled to the seat bottom and a distal second end coupled to a buckle.

18. A method of adjusting a crotch belt webbing on a child safety seat comprising:
providing the child safety seat comprising:
a seat bottom comprising a front end, a back end, and a top surface;
a crotch belt positioner adjustable from a first position to a second position, wherein the crotch belt positioner further comprises:

a first positioner plate disposed below the top surface of the seat bottom, the first positioner plate comprising a first position aperture and a second position aperture;

a second positioner plate disposed below the top surface, the second positioner plate comprising a third position aperture and a fourth position aperture; and an adjustment member operable to engage the first position plate and the second position plate; and the crotch belt webbing comprising a buckle disposed above the top surface of the seat bottom, the crotch belt webbing extending through an aperture of the crotch belt positioner; and adjusting the crotch belt positioner from the first position to the second position, wherein adjusting the crotch belt positioner from the first position to the second position adjusts the crotch belt webbing toward the back end of the seat bottom and shortens a length of the crotch belt webbing extending above the top surface of the seat bottom, wherein the aperture moves towards the back end of the seat bottom.

\* \* \* \* \*